Dec. 20, 1955　　　　E. KARWAT　　　　2,727,587
METHOD FOR THE PURIFICATION AND SEPARATION OF GAS MIXTURES
Filed Dec. 14, 1950
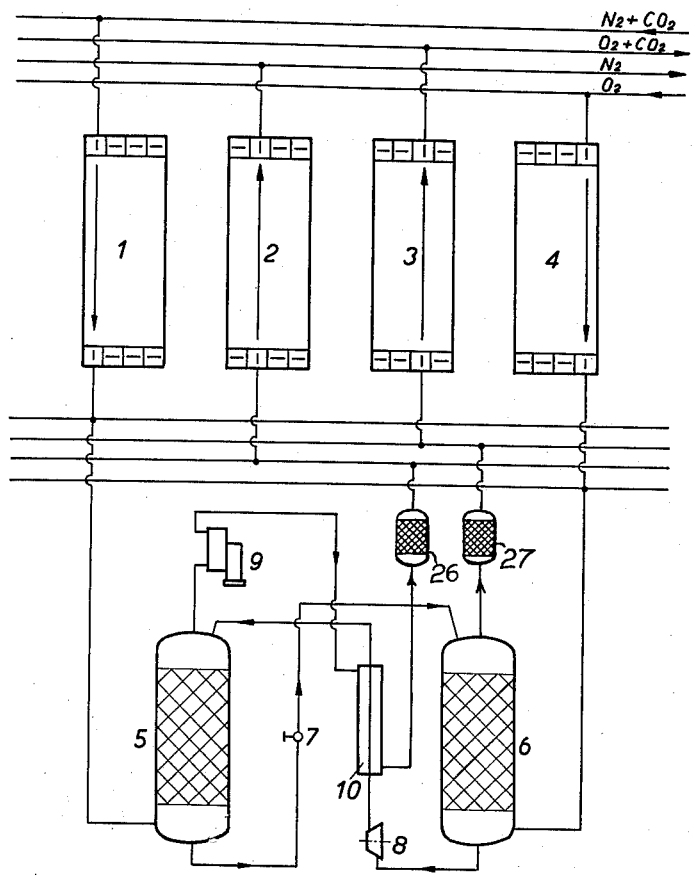
INVENTOR
ERNST KARWAT
By E. J. Freeman
ATTORNEY.

United States Patent Office 2,727,587
Patented Dec. 20, 1955

2,727,587

METHOD FOR THE PURIFICATION AND SEPARATION OF GAS MIXTURES

Ernst Karwat, Pullach, near Munich, Germany, assignor to Gesellschaft Fuer Linde's Eismaschinen A.-G., Hoellriegelskreuth, near Munich, Germany Application December 14, 1950, Serial No. 200,726

2 Claims. (Cl. 183—115)

This invention relates to a method for the purification and the separation of gas mixtures and for the recovery of the separated gas components.

The separation of gas mixtures into their components and the removal of undesirable constituents is generally effected by compression and washing of the gas mixtures with a liquid absorbent at a low temperature. The saturated washing liquid is hereafter expanded and heated for the removal of the absorbed gas component or components.

This invention as compared to the art greatly improves the heat economy of the known methods of separating gas mixtures for the recovery of at least one of their components by maintaining the washing liquid at the same temperature during the absorption and degassing stages.

It is an object of this invention to eliminate the above recited disadvantages in a method of separating a gas mixture for the recovery of one or more of its constituents by the use of an absorbent at a low temperature.

In order to comply with this object, the absorbed component or components are removed from the washing liquid at the washing temperature. This step may be performed by conducting the washing liquid with absorbed gas in counter-current contact with a previously cooled gas which expels and strips said washing liquid of said absorbed gas.

The applicability of the invention in practice is best apparent when a temperature is maintained which ranges between —40° C. and the temperature of air liquefaction.

The choice of the washing temperature used in conformity with the invention depends upon the characteristics of the components to be removed by washing and the absorbent and the gas pressure maintained during the washing procedure.

If, for instance, carbon dioxide is removed by washing from compressed and combusted gas, the washing temperature should be between —67° C. and —74° C.; it is to be understood that this does not in any way restrict the applicability of the invention to other washing temperatures.

The invention will now be described more in detail and with reference to the attached drawing.

In the drawing, the single view illustrates schematically an embodiment of an installation for the performance of the method forming the subject matter of this invention.

In the drawing, numerals 1, 2, 3, 4 denote four cold accumulators or regenerators which are provided with customary reversal means; numeral 5 denotes a washing column; numeral 6 a degassing or stripping column; numeral 7 denotes an expansion valve for the expansion of the washing liquid passed from the washing column to the degassing column; numeral 8 denotes a pump for its retransport from the degassing column to the washing column; numeral 9 an expansion device and numeral 10 a heat exchanger. Adsorbers 26 and 27 are provided for the removal of vapors of washing liquid.

The treatment of a combustion gas containing carbon dioxide ($CO_2$) and nitrogen ($N_2$) in this installation will now be described.

1510 cubic meters of a combustion gas, as indicated by the top line $N_2+CO_2$, for instance of a compressed and combusted gas containing twenty-four (24%) per cent carbon dioxide ($CO_2$) and seventy-six (76%) per cent nitrogen ($N_2$), which is compressed to 2.5 atmospheres, are conducted at a normal temperature into the cold accumulator 1.

The gas mixture having passed through the cold accumulator 1 and, having been cooled and dried therein, enters the bottom portion of the washing column 5 with a pressure of 2.4 atmospheres and a temperature of —67° C. It is washed with ethylene trichloride whereby the carbon dioxide ($CO_2$) content is reduced to two (2%) per cent. Thereupon the gas mixture is conducted into, and expanded in, an expansion device 9, whereby cold is produced. The gas mixture then passes into the top portion of the heat exchanger 10, is discharged from the bottom end thereof and is conducted through the adsorber 26 into the cold accumulator 2 from which it escapes along the line indicated by $N_2$.

A part of the produced cold is transferred in the heat exchanger 10 from the expanded nitrogen ($N_2$) to the washing liquid.

670 cubic meters of oxygen ($O_2$) having a pressure of 1.2 atmospheres are passed through the cold accumulator 4, dried therein and cooled to —74° C. The oxygen ($O_2$) passes at a pressure of 1.1 atmospheres as an auxiliary gas into the bottom portion of the degassing column 6. It is here saturated with carbon dioxide ($CO_2$) from the expanded washing liquid and is conducted in countercurrent therewith. Consequently 1000 cubic meters of the oxygen-and-carbon-dioxide ($O_2+CO_2$) mixture containing 33 per cent carbon dioxide ($CO_2$) escapes from the stripping column 6. The gas mixture is conducted through the adsorber 27 into the cold accumulator 3, heated to a normal temperature while removing water, which was deposited during prior work periods from the initial gas and from oxygen, and is passed from the installation at a normal pressure. The adsorbers 26 and 27 separate and recover the adsorbed vapors of the washing liquid entrained by the nitrogen ($N_2$) and by the oxygen-and-carbon-dioxide ($O_2+CO_2$) mixture, respectively.

The cold accumulators are operated by the customary cyclic exchange method in such a manner that a complete heat exchange results between the inflowing and outflowing gases.

To cool the oxygen ($O_2$) conducted into the degassing column 6 to the particularly low temperature which prevails in the lower portion thereof, the oxygen ($O_2$) is entered through a regenerator which has previously been cooled by discharged nitrogen ($N_2$) as explained below.

The absorption of the carbon dioxide takes place in the washing column 5 at a partial pressure of the carbon dioxide ($CO_2$) of between 0.57 to 0.047 atmosphere within a temperature range of between —74° C. in the top of the washing column 5 and —67° C. in the bottom portion thereof. During the expulsion of the carbon dioxide ($CO_2$), its partial pressure is between 0.36 atmosphere in the upper end of the degassing column 6 and 0.041 atmosphere in the bottom end thereof. The temperature of the washing liquid drops at the same time from —67° C. at the top end to —74° C. at the lower end of the degassing tower 6.

In the exemplification illustrated and described, the regenerators 1 and 2 have received combustion gas mixture ($N_2+CO_2$) and nitrogen ($N_2$), respectively, while the regenerators 3 and 4 have received oxygen-and-carbon-dioxide ($O_2+CO_2$) mixture and oxygen ($O_2$), respectively. In the next cycle, the regenerator 1 that was heated by the combustion gas mixture ($N_2+CO_2$) will subsequently be cooled by the cool oxygen-and-carbon-dioxide ($O_2+CO_2$) mixture, while the regenerator 4 will be heated by the oxygen ($O_2$) and cooled by cool nitrogen ($N_2$). In addition, the regenerator 2 that was cooled by the nitrogen will subsequently be heated by the warm oxygen and the regenerator 3 that was cooled by the cool oxygen and carbon dioxide ($O_2+CO_2$) will subsequently be heated by the warm combustion gas ($N_2+CO_2$).

It is also possible to pair instead the regenerators 1 and 2 for alternation therebetween and, respectively, to pair the regenerators 3 and 4 for alternation therebetween.

If it is desired to produce a dry oxygen-and-carbon-dioxide ($O_2+CO_2$) mixture, this may be done by applying to the regenerators 3 or 4 whichever is receiving only oxygen in the immediately preceding working period warm and dry oxygen ($O_2$), for instance, obtained from a gas separator.

It is also possible to interchange cyclically all of the regenerators. It is only necessary that to each regenerator there is alternately supplied a warm gas to heat the regenerator and thereafter a cold gas flowing in an opposite direction to cool it again.

The warm combustion gas mixture ($N_2+CO_2$), and occasionally also the oxygen ($O_2$), is wet. When the wet gases stream through the previously cooled regenerators, the water vapor will condense and freeze. In the succeeding period, in which the regenerators are switched, the gases emanating from the washing and degassing columns, namely the oxygen-and-carbon-dioxide ($O_2+CO_2$) mixture and the nitrogen ($N_2$) will receive from the regenerator the previously deposited water.

The power requirement for the operation of the above described installation is extremely low, and the power which is required for the separation of the nitrogen ($N_2$) from the treated gas mixture ($N_2+CO_2$) is greatly below the one which is required for the separation of nitrogen ($N_2$) from air.

In conformity with the above described embodiment, oxygen ($O_2$) is named as an auxiliary gas for the desorption of carbon-dioxide ($CO_2$) from the washing fluid since the same refers to the production of oxygen-and-carbon-dioxide ($O_2+CO_2$) mixtures.

Other auxiliary gases, for instance methane, may be used if either the recovery of a methane carbon dioxide mixture is intended, or if methane is available for other reasons. This situation will be realized if compressed coke oven gas upon being precooled to −45° C. is washed with toluene for the removal of the carbon dioxide and other gaseous impurities prior to its further separation by deep cooling. The regeneration of the washing fluid is preferably effected with the methane containing fraction which is discharged from the deep cooling separator at a temperature about −45° C. The methane takes up the carbon dioxide and other gas components from the washing liquid to be heated thereupon finally in the usual manner.

In the exemplification, the washing temperature and the washing medium are chosen in such a manner that the latter does not have a substantial vapor pressure so as to prevent substantial liquid vaporization.

The invention is not restricted to the embodiment shown and described, and the invention may be used with equal success for the treatment of other gas mixtures, for instance, the removal of sulfur dioxide from gas mixtures by washing and for the concentration of sulfur dioxide in a gas mixture.

Having thus described the invention, what I claim as new and desire to be secured by Letters Patent, is as follows.

1. A method of separating and recovering one of the components of a gas mixture by absorption in a low temperature washing liquid comprising, cooling said gas mixture to about the temperature of said washing liquid, cooling an auxiliary gas to about said temperature, said gas mixture and auxiliary gas each being separately cooled in cold accumulators, washing said cooled gas mixture with said low temperature washing liquid to absorb said one component at a pressure above atmospheric, reducing the pressure of said liquid containing said one component, contacting said liquid at said reduced pressure countercurrently with said cooled auxiliary gas to remove said absorbed one component, and cyclically cooling other cold accumulators, which in a previous cycle were used to cool said gas mixture and said auxiliary gas, with unabsorbed gas flowing from said absorption step and by the mixture of removed one component and auxiliary gas from said desorption step.

2. A method as set forth in claim 1, wherein said unabsorbed gas before flow to said accumulators is first expanded to reduce its temperature and then indirectly heated by cooling said desorbed liquid.

References Cited in the file of this patent

UNITED STATES PATENTS

| | | |
|---|---|---|
| 1,942,131 | Baumann | Jan. 2, 1934 |
| 2,128,692 | DeBaufre | Aug. 30, 1938 |
| 2,141,997 | Linde et al. | Dec. 27, 1938 |
| 2,516,717 | Ogorzaly | July 25, 1950 |
| 2,555,060 | Schuftan | May 29, 1951 |
| 2,596,785 | Nelly, Jr., et al. | May 13, 1952 |

FOREIGN PATENTS

| | | |
|---|---|---|
| 286,622 | Great Britain | June 5, 1929 |
| 503,220 | Great Britain | Mar. 27, 1939 |